H. W. McALL.
TEMPLET FOR DRAWING RAILWAY SWITCHES AND CROSSOVERS.
APPLICATION FILED APR. 11, 1913.
1,105,809.
Patented Aug. 4, 1914.
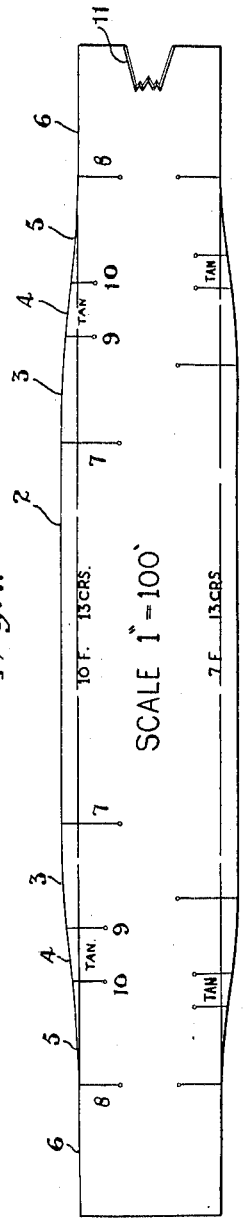
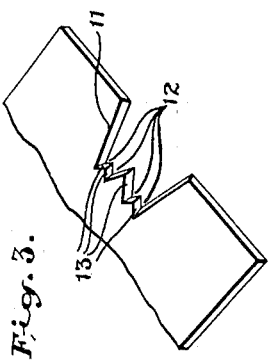
Witnesses.
H. L. Trimble.
E. Heron
Inventor.
Henry W. McAll.
by H. J. S. Dennison.
Atty.

UNITED STATES PATENT OFFICE.

HENRY WARDLAW McALL, OF TORONTO, ONTARIO, CANADA.

TEMPLET FOR DRAWING RAILWAY SWITCHES AND CROSSOVERS.

1,105,809.   Specification of Letters Patent.   Patented Aug. 4, 1914.

Application filed April 11, 1913. Serial No. 760,470.

*To all whom it may concern:*

Be it known that I, HENRY WARDLAW MCALL, a subject of the King of Great Britain, and resident of the city of Toronto, county of York, Province of Ontario, in the Dominion of Canada, have invented certain new and useful Improvements in Templets for Drawing Railway Switches and Crossovers, as described in the following specification and illustrated in the accompanying drawings, that form part of the same.

The principal objects of the invention are, to effect a saving of time in the laying out of drawings of railway switches and crossovers, and to devise a templet for the draftsman's use which will give the required distances and curves necessary for indicating such switches and crossovers in the standard scales.

The principal feature of the invention consists in the novel formation of the templet whereby the reverse curve of a switch or crossover may be drawn with one operation and the proper intermediate tangent portion indicated.

A further important feature consists in the novel means for giving the spacing distances for the rails.

In the drawings, Figure 1 is a plan view of a templet constructed in accordance with this invention. Fig. 2 is a view illustrating the class of drawing in which the device is used. Fig. 3 is an enlarged perspective detail of one end of the templet showing the track spacing portion.

Like numerals of reference indicate corresponding parts in each figure.

Referring to the drawings, 1 is the templet which may be made of any suitable material but is preferably formed of a strip of sheet celluloid or transparent xylonite. The edge 2 of the templet is formed with an inward curved portion 3 toward each end and the said curve merges into a tangent 4 leading to a curve 5, the reverse of the curve 3. The edge 6 of the templet continues from the curve 5 and is tangential thereto and parallel with the edge 2 and spaced the proper distance therefrom corresponding with the distances between the centers of a double track road according to the scale employed, the line being continued preferably on the under side of the templet to facilitate the accurate placing of the templet on the paper. The points 7 and 8 indicate the distance between the terminal ends of the total length of the double curve which forms a crossover, that is the distance between the switches, and the points 9 and 10 indicate the intersection of the tangent between the reverse curves.

With a templet of this kind an engineer or draftsman may lay out the track curves used in crossovers and switches very rapidly and the marks given thereon for each such curve enable him to determine the exact locations of the switches and frogs.

In the templet herein illustrated I show two forms of switches and crossovers, namely, one with two Number 10 frogs and the other using two Number 7 frogs and the distance between centers of tracks scales thirteen feet. In my templet I provide on one side two compound crossover curves, one the reverse of the other for each number of frog so that whatever may be desired may be laid out by the draftsman very quickly.

In order to further facilitate the work of the draftsman in drawing tracks, I provide a special track gage on one of the edges of the scale preferably at the end. This gage is formed by cutting a notch 11 in the end of the scale. The bottom of the notch 11 is formed with a plurality of minor notches 12 arranged in two or more pairs and said pairs are spaced apart with their centers corresponding with the distance between the straight edges 2 and 6 of the scale. The edges of the notches 11 and 12 are beveled so that sloping clefts 13 are formed into which the point of a pencil may be inserted very readily and will slip down and mark the proper point in the notches 12 without the necessity of the usual care or accuracy on the part of the draftsman. This arrangement for laying down the points for drawing the tracks will effect a great saving of time as the use of dividers and scales will be entirely eliminated for this purpose, and the method is equally applicable when both rails are drawn or as in the case of drawings made on small scales only the center line of track is indicated. In the latter case the left hand or right hand notch of each pair will be employed. The tracks will thus all be uniformly spaced. The arrangement of the spacing notches is an important feature and may be used for any standard spacing saving time to a draftsman and greatly increasing the accuracy of the work.

It will be seen that with a templet of this kind the draftsman may lay down his track lines and wherever a switch or a crossover is desired he simply has to lay the templet down upon the track lines and draw the compound or reverse curve in position with whichever frog is desired.

The templet will of course be provided for various scales and for any required frog, the one herein shown being indicated as on a scale of one inch to one hundred feet and for frogs Number 7 and Number 10.

The application of the use of this templet for drawing the rails is shown in the drawing as indicating both rails but it will of course be equally applicable to drawings where the track is indicated by a single center line.

What I claim as my invention is:—

1. A templet having straight and parallelly arranged edges offset and connected by a compound reverse curve corresponding with the geometrical compound curve of a railway switch or crossover.

2. A templet having a centrally arranged straight edge portion, a tangent curve extending from the end of said central straight edge leading to an angularly set tangent, a curve joined to said tangent and forming the reverse of the aforesaid curve, and a straight edge meeting the latter edge tangentially, said latter straight edge being arranged in parallel relation with the central straight edge portion and spaced a set distance laterally therefrom.

3. A templet having a central straight edge portion and compound reverse curves extending tangentially therefrom and merging into straight end portions arranged one in alinement with the other and spaced a prescribed distance laterally in relation to the central straight edge portion.

Signed at the city of Toronto, county of York, Province of Ontario, in the Dominion of Canada, this 1st day of April 1913.

HENRY WARDLAW McALL.

Witnesses:
A. G. KELLY,
H. L. TRIMBLE.

---

Copies of this patent may be obtained for five cents each, by addressing the "Commissioner of Patents, Washington, D. C."